Figure 6:
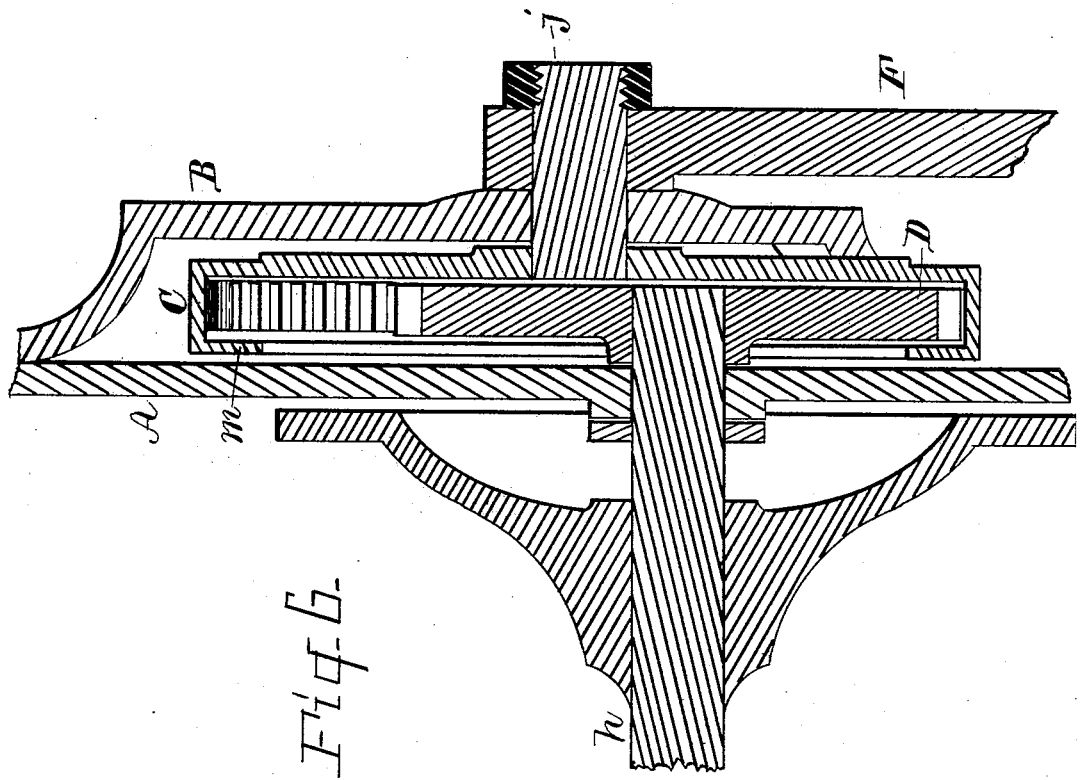

(No Model.) 4 Sheets—Sheet 1.
H. BROWN.
BICYCLE.
No. 393,417. Patented Nov. 27, 1888.
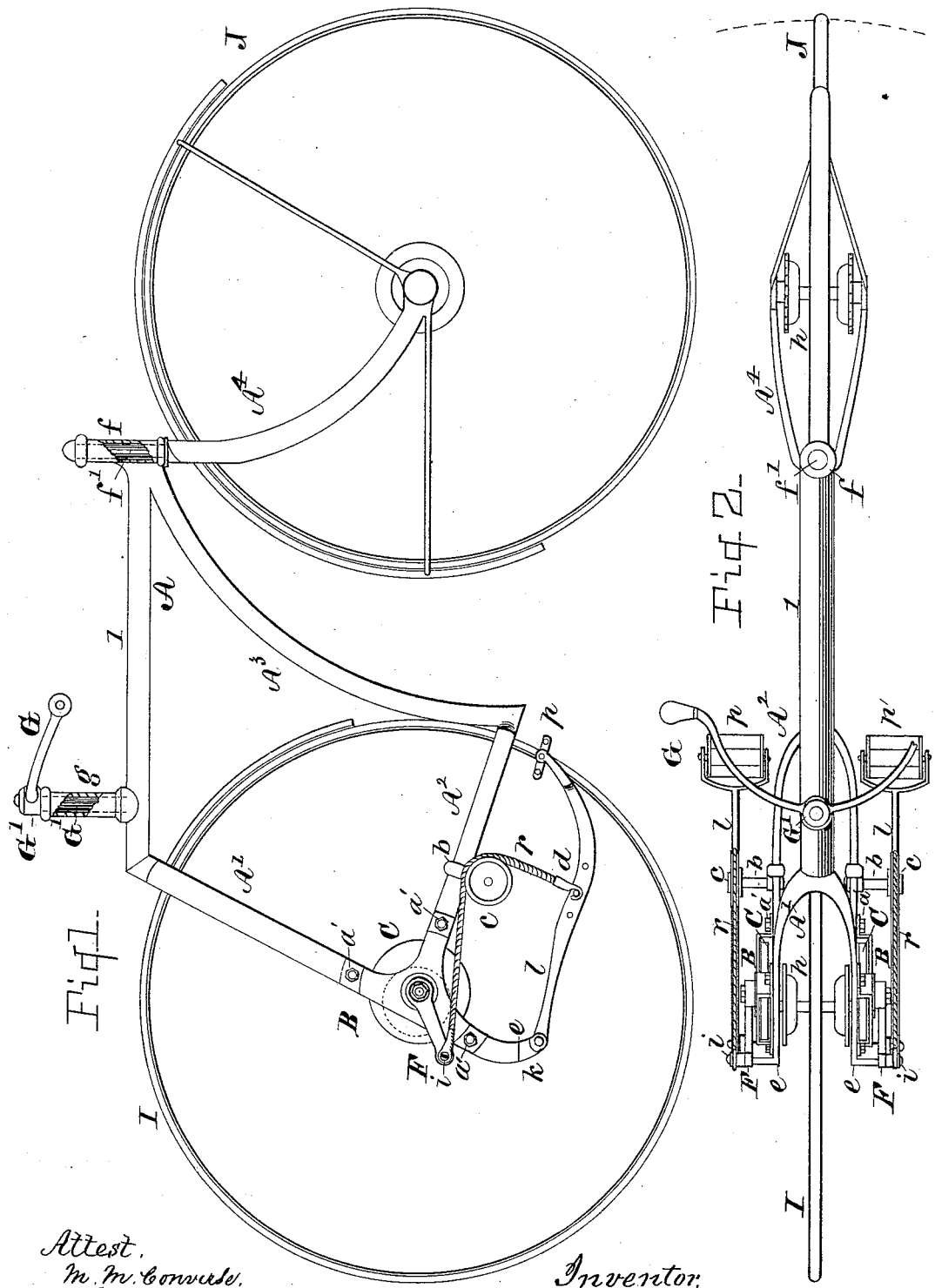
Attest.
M. M. Converse.
Ora Converse.
Inventor.
Harvey Brown,
B. C. Converse, Atty.

(No Model.) 4 Sheets—Sheet 2.
H. BROWN.
BICYCLE.
No. 393,417. Patented Nov. 27, 1888.
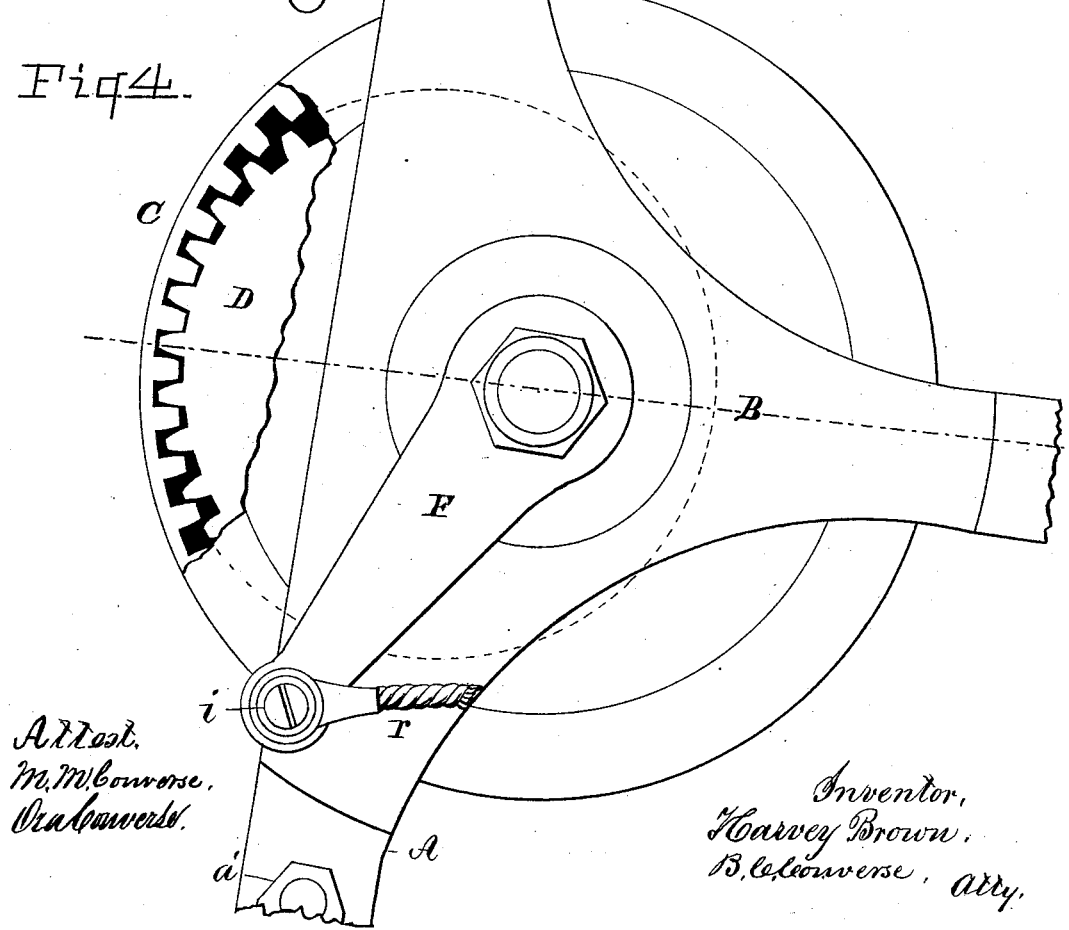

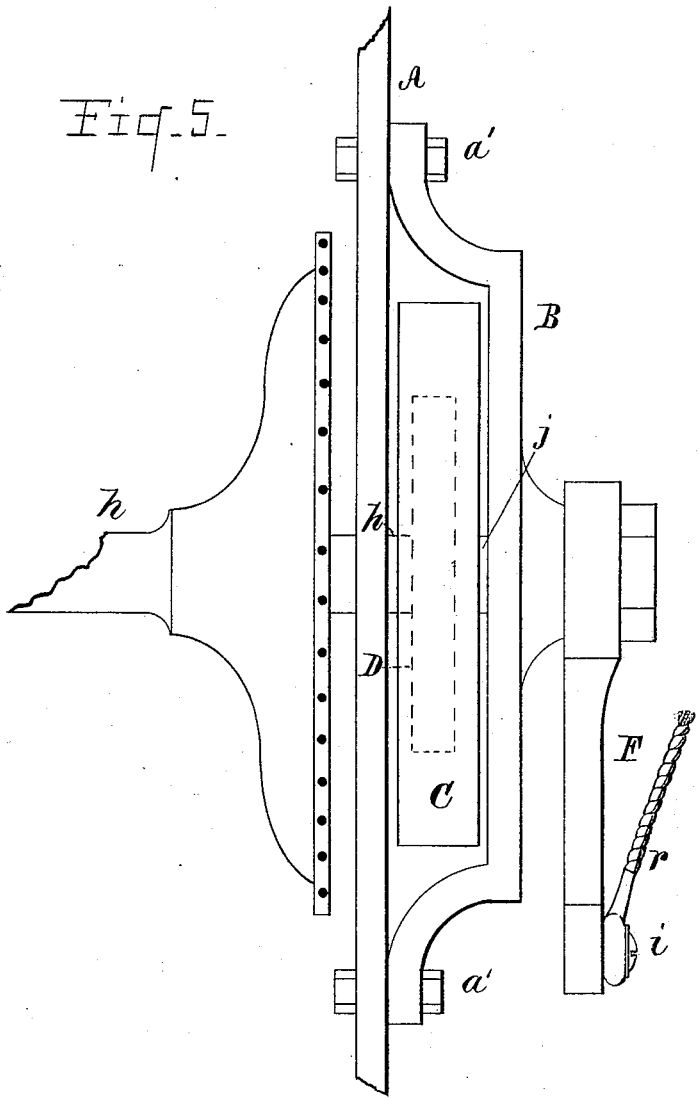

(No Model.)  4 Sheets—Sheet 4.

H. BROWN.
BICYCLE.

No. 393,417.  Patented Nov. 27, 1888.

Attest,
Wo. W. Converse,
Ora Converse.

Inventor,
Harvey Brown,
B. C. Converse,
atty.

United States Patent Office.

HARVEY BROWN, OF BRANDT, OHIO.

BICYCLE.

SPECIFICATION forming part of Letters Patent No. 393,417, dated November 27, 1888.

Application filed July 5, 1888. Serial No. 279,036. (No model.)

*To all whom it may concern:*

Be it known that I, HARVEY BROWN, a citizen of the United States, residing at Brandt, in the county of Miami and State of Ohio, have invented certain new and useful Improvements in Bicycles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in bicycles, and is more particularly applicable to that class of bicycles or velocipedes called "safety," in which the wheels are nearly or quite of equal size, the object being to facilitate easy steering and at the same time to prevent the front wheel from swerving from side to side as power is applied to the pedals, this fault being common to machines of this class. A further object is to increase the speed to equal that of a bicycle having a larger pedal-wheel. I attain the first of these objects by the use of a rigid frame of peculiar construction for the front wheel, and pivoting the fork which supports the rear wheel in the rear end of the backbone of said frame, making the latter wheel the steering-wheel. The increase of speed is attained by means of internal and spur gears proportioned to obtain a speed equal to that of larger driving-wheels without material variation in the pedal movements (for a given distance) from what is required in the latter wheels by using the crank with the pedals directly attached thereto.

A further improvement consists in the construction and arrangement of the steering-gear which is inclosed in the backbone, and is specially applicable to this form of bicycle.

Figure 1 is a side elevation of a bicycle of the safety class having my improvements embodied therein. Fig. 2 is a top view of the same. Fig. 3 is a view of the backbone, as seen from the under side, and showing the steering-gear as arranged therein. Fig. 4 is a side elevation of the driving-gear on the left side of the wheel. Fig. 5 is a front view of the same, the spur-wheel being shown in this figure in dotted lines. Fig. 6 is a horizontal cross-section of the same.

In the drawings, I and J are the front and rear wheels, respectively. These are of nearly or quite equal size. They are connected and supported by a strong trapezium-shaped frame, A, having all the parts which form its sides and extensions rigidly united together, and consisting of the horizontal semi-tubular backbone 1, the front fork, A′, extending downward and forward from the front end of the latter and straddling the front wheel, I, the fork $A^2$, forming the lower side of the frame and intersecting the fork A′ at the axis of the wheel at about a right angle, and the rear (coupling) bar, $A^3$, which springs from the rear end of fork $A^2$ and extends in a curve upward and backward, and, uniting with the backbone 1, forms the rear angle of the frame, which latter terminates in a sleeve, $f$, within which the pintle $f'$ of the fork $A^4$ of the steering-wheel J is pivoted. The limbs of fork $A^4$ curve downward and backward to the points of their attachment over the ends of the axle of wheel J. The sleeve $f$ is vertical, and as its axial line is in the line of a perpendicular about one-half way between the verge and center of wheel J, the latter easily follows the front wheel and can be readily steered by the steering devices, which will be described hereinafter.

The frame A is tubular with the exception of the fork-limbs and backbone, the latter being by preference semi-tubular. The limbs of the front fork, A′, extend below the axial line of the wheel I and turn outward at an angle, $e$, and then downward to form the ears $k$, for attaching the pivotal ends of the two foot-levers $l$, as seen in Figs. 1 and 2. At the angle formed by the intersection of the limbs of forks A′ and $A^2$ the axle $h$ of wheel I extends through the frame and has rigidly fastened upon its opposite ends outside of the frame a spur-wheel, D. This wheel is engaged by an internal gear-wheel, C, which latter is rigidly secured to the inner end of a short shaft, $j$, having its bearing in a heavy three-armed plate, B, bolted to the frame (by bolts $a'$ $a'$ $a'$) over the wheel-centers. The front edge of this plate is flush with the front edge of fork A′. That part of it covering wheel C is raised so as to leave a recess sufficiently large between it and the frame for the gearing, and on the central part outside is a boss or hub to give the shaft $j$ as long a bearing as possible. The hole in plate B for shaft $j$ is not in line with the axial line of axle $h$, but is in rear of it, for the purpose of bringing the drive-crank F farther back to better accommodate the foot movement and to allow of the proper adjustment of foot-levers $l\ l$ and their connections. By reference to Fig. 6 it will be seen that the two shafts $h$ and $j$ are in about the same horizontal plane, and that the spur-wheel D is about two-thirds the size of the wheel C, the proportions of teeth being about two to three. The wheel C has a flange, $m$, extending from the verge toward the axle $h$ of the inclosed spur-wheel D, completely incasing its teeth on the inner side, while the outer side is entirely inclosed, as seen also in Figs. 1, 4, and 5. This incasement prevents mud and dirt from falling into the gearing, and the spur-wheel D is held from displacement. Sufficient space is left between the inner side of wheel D and the inner wall of the case of wheel C on both sides to give free movement to the gearing.

Outside of plate B, on the shaft $j$, is secured the crank F by a nut, in the usual manner. On the wrist $i$ of the crank is pivoted the eye of the wire cable $r$, which latter passes back over a fixed pulley, $c$, pivoted on the end of a bracket, $b$, of L shape, suspended from each arm of fork A², and has on the end a hook, $d$, straddling the lever $l$ and engaging one of a series of pins or bosses thereon. The levers $l$ curve upward and have pedals $p$ on their ends which are adapted for the purpose, and they reach back the proper distance for the convenience of the operator. I prefer the use of wire cable for the foot-lever and crank-connections as being more easily kept clean and requiring no grease or oil, besides being devoid of noise in operating.

The steering-gear, which is illustrated in detail in Fig. 3, consists of two grooved wheels or sheaves, 2 and 2, which are attached upon the pivoted handle-post G' and the pintle $f'$ of the steering-fork A⁴, respectively. Two small wire cables, 3, crossing each other in the middle, extend from end to end of the backbone 1 on the inner side, and have their respective ends secured to opposite sides of the two grooved wheels 2 2, so that by operating the handles G of the steering-post G' the rear wheel, J, is turned as desired, the handles being turned, as in dotted lines, Fig. 3, in the direction in which the bicycle is desired to move.

The further operation of the machine can be sufficiently understood by reference to the drawings.

I claim as my invention—

1. In a bicycle, a rigid trapezium-shaped frame consisting, substantially, of a straight semi-tubular backbone, a front fork extending downward and forward therefrom to a point below the axial line of the front wheel, a coupling-fork having its limbs united to said front fork at the wheel-center and extending rearward and downward to a point behind said front wheel, and from thence (at the point of bifurcation) having a single curved bar extending upward and backward and joined to the rear end of said backbone, and terminating with the latter in vertical hollow post extended above said backbone for pivoting the pintle of the steering-fork, said backbone being provided with a similar vertical hollow post at its front end in the same horizontal plane, for pivoting the steering-post, as hereinbefore described.

2. In a bicycle, the combination of a rigid trapezium-shaped fore frame, the horizontal semi-tubular backbone forming the seat-bar of said frame, the two forks joined at the axial line of the front wheel, the front fork having an extension below said axial line, the three-armed bent plate connecting said fork, arms, and said lower extension and covering the driving-gear, and the coupling-bar extending from the bifurcation of the lower fork of said frame in a curve upward and rearward and joined to the rear end of said horizontal semi-tubular backbone, as set forth.

3. The combination, in a bicycle of the character described, of a rigid fore frame, a driving-wheel axially pivoted in said frame and having a spur-wheel on the opposite ends of its axle outside of said frame, an internal gear-wheel engaging said spur-wheel, incased as described, said internal gear-wheel having its shaft journaled in a heavy raised plate bolted to said frame and the latter having the steering-wheel pivoted at the rear end, with means for operating said driving devices and said steering-wheel, substantially as herein set forth.

4. In a bicycle, the combination, with the rigid fore frame and the steering-fork pivoted thereto, of the foot driving mechanism described, consisting of the foot-levers having their fulcra in the lower extensions of the front fork, the brackets adjustably attached to the limbs of the lower fork and carrying the fixed pulleys thereon, the wheel-cranks, and the wire cables connecting the latter and said foot-levers and extending over said fixed pulleys, arranged and operated substantially as set forth.

5. In a bicycle, the combination of a rigid fore frame having the two intersecting forks joined at the axial line of the front wheel, the lower one of said forks inclining downwardly from the wheel-center to the point of its bifurcation, and thence curving upward and rearward in a single bar to the rear angle of said frame, the straight horizontal semi-tubular backbone forming the top or saddle bar, the latter having a hollow vertical post at the front and rear ends, the steering-post and steering-fork pivoted in the same horizontal plane in said vertical posts, each being provided with a grooved pulley in the cavity of said backbone, and the crossed-wire cables having their opposite ends attached, respectively, to said pulleys, and adapted to be operated substantially as set forth.

6. In the driving mechanism of a bicycle, the combination, with the gears described and the driving-cranks, of the foot-levers pivoted at their front ends to the lower extensions of the front fork, the brackets adjustably attached to the limbs of the lower fork and supporting the fixed pulleys, and the wire cables extending over the latter and provided with a hook upon each end engaging with the crank and foot-lever upon each side, respectively.

In testimony whereof I affix my signature in presence of two witnesses.

HARVEY BROWN.

Witnesses:
C. BROOKE BUCKLEY,
ORA CONVERSE.